United States Patent
Baird et al.

(10) Patent No.: US 11,167,865 B2
(45) Date of Patent: Nov. 9, 2021

(54) ADDITIVELY MANUFACTURED LUBRICATION CHANNELS

(71) Applicant: GOODRICH CORPORATION, Charlotte, NC (US)

(72) Inventors: Bradley William Baird, Grimsby (CA); Eric Goldring, Oakville (CA); Karthik Narayan, Milton (CA)

(73) Assignee: Goodrich Corporation, Charlotte, NC (US)

( * ) Notice: Subject to any disclaimer, the term of this patent is extended or adjusted under 35 U.S.C. 154(b) by 249 days.

(21) Appl. No.: 16/408,944

(22) Filed: May 10, 2019

(65) Prior Publication Data

US 2020/0354085 A1    Nov. 12, 2020

(51) Int. Cl.
| | |
|---|---|
| *B64F 5/10* | (2017.01) |
| *B29C 64/153* | (2017.01) |
| *B22F 5/10* | (2006.01) |
| *F16C 33/10* | (2006.01) |
| *B22F 10/20* | (2021.01) |
| *B33Y 10/00* | (2015.01) |
| *B33Y 80/00* | (2015.01) |
| *B29L 31/30* | (2006.01) |
| *B64C 25/20* | (2006.01) |

(52) U.S. Cl.
CPC ............... *B64F 5/10* (2017.01); *B22F 5/106* (2013.01); *B22F 10/20* (2021.01); *B29C 64/153* (2017.08); *B64C 25/20* (2013.01); *F16C 33/10* (2013.01); *B29L 2031/3076* (2013.01); *B33Y 10/00* (2014.12); *B33Y 80/00* (2014.12)

(58) Field of Classification Search
CPC .. B64F 5/10; B22F 10/20; B22F 5/106; B22F 5/00; B22F 5/10; B29C 64/153; B64C 25/20; B64C 25/34; B64C 25/02; F16C 33/10; B33Y 10/00; B33Y 80/00; B29L 2031/3076; Y02P 10/25; F16N 2210/08; F16N 7/00; F16N 21/02
See application file for complete search history.

(56) References Cited

U.S. PATENT DOCUMENTS

| | | | |
|---|---|---|---|
| 2,659,615 A | 11/1953 | Mcclain | |
| 2,792,998 A | 5/1957 | Dowty | |
| 6,129,310 A * | 10/2000 | Squires | B64C 25/00 |
| | | | 244/102 R |

(Continued)

FOREIGN PATENT DOCUMENTS

| | | |
|---|---|---|
| CN | 109533296 | 3/2019 |
| DE | 102016222411 | 5/2018 |

(Continued)

OTHER PUBLICATIONS

European Patent Office, European Search Report dated Jun. 29, 2020 in Application No. 19214720.5.

*Primary Examiner* — Lawrence Averick
(74) *Attorney, Agent, or Firm* — Snell & Wilmer L.L.P.

(57) ABSTRACT

An additively manufactured component for a landing gear assembly may comprise a lug and a lubrication channel extending through the lug. The lubrication channel may comprise an inlet and an outlet. The outlet may be located at a pin orifice defined by the lug. A center axis of a first portion of the lubrication channel may be oriented at an angle relative to a center axis of a second portion of the lubrication channel.

20 Claims, 5 Drawing Sheets

(56) References Cited

U.S. PATENT DOCUMENTS

| | | | | |
|---|---|---|---|---|
| 6,409,121 | B1* | 6/2002 | Lindahl | B64C 25/02 |
| | | | | 244/100 R |
| 7,264,398 | B2* | 9/2007 | Davies | B64C 25/34 |
| | | | | 384/322 |
| 9,140,302 | B2* | 9/2015 | Kane | F16C 33/121 |
| 9,958,068 | B2 | 5/2018 | Hinton et al. | |
| 10,890,211 | B2* | 1/2021 | Bennett | F16C 33/121 |
| 2003/0039420 | A1* | 2/2003 | Davies | F16C 33/201 |
| | | | | 384/300 |
| 2014/0369634 | A1* | 12/2014 | Kane | F16C 33/1095 |
| | | | | 384/322 |
| 2015/0258610 | A1 | 9/2015 | Villain-Chastre et al. | |
| 2015/0337896 | A1 | 11/2015 | Dayot et al. | |
| 2016/0047412 | A1* | 2/2016 | Stuk | F16C 33/04 |
| | | | | 384/276 |
| 2016/0199913 | A1 | 7/2016 | Mark | |
| 2017/0313414 | A1 | 11/2017 | Baird | |
| 2017/0361923 | A1* | 12/2017 | Himmelmann | B23K 9/173 |

FOREIGN PATENT DOCUMENTS

| | | |
|---|---|---|
| EP | 3269524 | 1/2018 |
| EP | 3275780 | 1/2018 |
| GB | 2521392 | 6/2015 |
| WO | 2018077884 | 5/2018 |

* cited by examiner

ADDITIVELY MANUFACTURED LUBRICATION CHANNELS

FIELD

The present disclosure relates to landing gear, and more particularly, to additively manufactured lubrication channels for landing gear joints.

BACKGROUND

Landing gear components generally include lubrication channels. The lubrication channels are typically drilled through the landing gear components to provide a flow path to provide lubrication to a joint of the landing gear component. These lubrication channels can create stress concentration regions and/or potential fatigue failure points in the landing gear components. Additionally, forming the lubrication channels by drilling through the various landing gear components tends to increase the time and cost associated with channel formation. It also tends to limit the possible channel locations and geometries, as a limited number of areas are accessible to the machines used to drill the channels.

SUMMARY

An additively manufactured component for a landing gear assembly is disclosed herein. In accordance with various embodiments, the additively manufactured component may comprise a first lug defining a first pin orifice and a first lubrication channel extending through the first lug. The first lubrication channel may comprise an inlet and an outlet. The outlet may be located at the first pin orifice. A center axis of a first portion of the first lubrication channel may be oriented at a first angle relative to a center axis of a second portion of the first lubrication channel.

In various embodiments, a cross-section of the second portion of the first lubrication channel may comprise an oblong shape having a first dimension that is greater than a second dimension. In various embodiments, a shape of a cross-section of the first portion of the first lubrication channel may be different from a shape of a cross-section of the second portion of the first lubrication channel.

In various embodiments, the first angle may be less than 180°. In various embodiments, the inlet of the first lubrication channel may be circumferentially offset from the outlet of the first lubrication channel.

In various embodiments, the additively manufactured component may further comprise a second lug defining a second pin orifice axially aligned with the first pin orifice. A second lubrication channel may extend through the second lug. In various embodiments, a center axis of a first portion of the second lubrication channel may be oriented at a second angle relative to a center axis of a second portion of the second lubrication channel. The second angle may be less than 180°. In various embodiments, the second lubrication channel may be fluidly connected to the inlet of the first lubrication channel.

A landing gear assembly is also disclosed herein. In accordance with various embodiments, the landing gear assembly may comprise a first component defining a first pin orifice and a first lubrication channel defined by the first component. The first lubrication channel may comprise an inlet and a first outlet. The first outlet may be located at the first pin orifice. A center axis of a first portion of the first lubrication channel may be oriented at a first angle relative to a center axis of a second portion of the first lubrication channel. The landing gear assembly may further comprise a second component defining a second pin orifice and a pin located through the first pin orifice and the second pin orifice.

In various embodiments, the first angle may be less than 180°.

In various embodiments, a cross-section of the second portion of the first lubrication channel comprises an oblong shape having a first dimension that is greater than a second dimension. In various embodiments, a shape of a cross-section of the first portion of the first lubrication channel is different from a shape of a cross-section of the first outlet of the first lubrication channel.

In various embodiments, a second lubrication channel may be defined by the second component. In various embodiments, a center axis of a first portion of the second lubrication channel may be oriented at a second angle relative to a center axis of a second portion of the second lubrication channel. The second angle may be less than 180°.

In various embodiments, the inlet of the first lubrication channel may be circumferentially offset from the first outlet of the first lubrication channel.

In various embodiments, the first lubrication channel may further include a second outlet located at the first pin orifice. In various embodiments, the first outlet may be circumferentially offset from the second outlet.

A method of forming a landing gear component is also disclosed herein. In accordance with various embodiments, the method may comprise forming the landing gear component using additive manufacturing. The landing gear component may comprise a first lug defining a first pin orifice and a first lubrication channel extending through the first lug. The first lubrication channel may comprise an inlet and an outlet. The outlet may be located at the first pin orifice. A center axis of a first portion of the first lubrication channel may be oriented at an angle relative to a center axis of a second portion of the first lubrication channel.

In various embodiments, forming the landing gear component may comprise forming the first portion of the first lubrication channel having a first cross-section shape, and forming the second portion of the first lubrication channel comprising a second cross-section shape different from the first cross-section shape.

In various embodiments, the landing gear component may further comprise a second lug defining a second pin orifice, and a second lubrication channel extending through the second lug. The second lubrication channel may comprise a second outlet located at the second pin orifice.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily repeated herein for the sake of clarity.

A first component that is "radially outward" of a second component means that the first component is positioned at a greater distance away from a common axis of the first and second components than the second component. A first component that is "radially inward" of a second component means that the first component is positioned closer to a common axis of the first and second components than the second component.

As used herein, the term "additive manufacturing" encompasses any method or process whereby a three-dimensional object is produced by creation of a substrate or material, such as by addition of successive layers of a material to an object to produce a manufactured product that has an increased mass or bulk at the end of the additive manufacturing process as compared to the beginning of the process. In contrast, traditional (i.e., non-additive) manufacturing by machining or tooling typically relies on material removal or subtractive processes, such as cutting, machining, extruding, turning, drilling, grinding, stamping, and/or the like, to produce a final manufactured object that has a decreased mass or bulk relative to the starting workpiece. Other traditional, non-additive manufacturing methods include forging or casting, such as investment casting, which utilizes the steps of creating a form, making a mold of the form, and casting or forging a material (such as metal) using the mold. As used herein, the term "additive manufacturing" should not be construed to encompass a joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Figure 1:
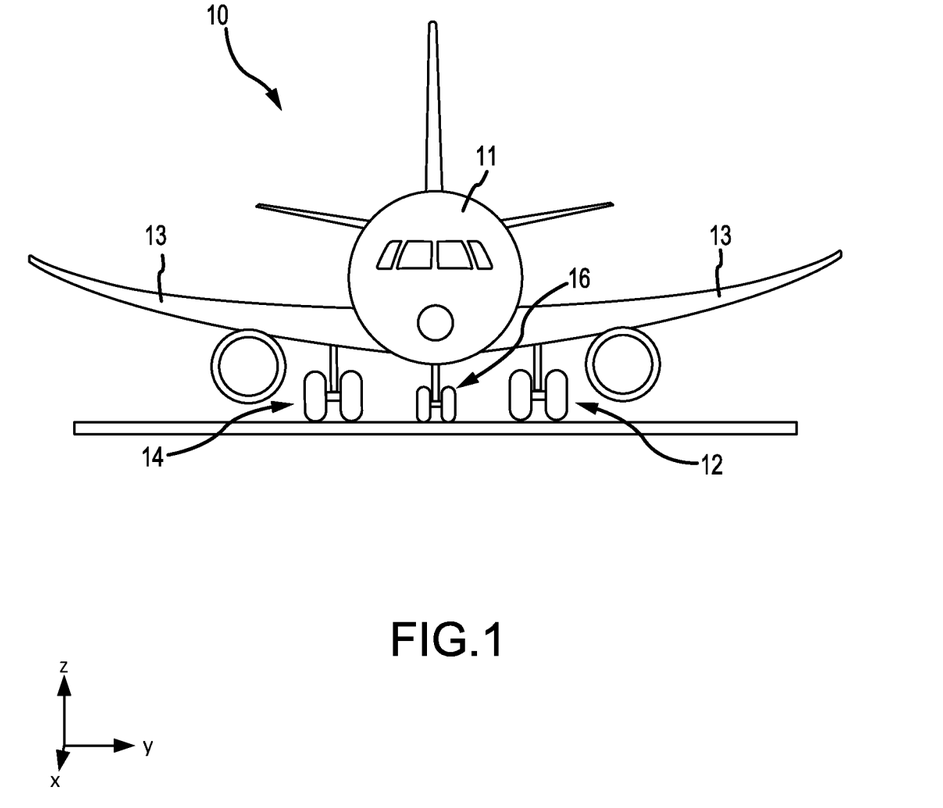
FIG. 1 illustrates an aircraft, in accordance with various embodiments.

With reference to FIG. 1, an aircraft 10 is illustrated, in accordance with various embodiments. Aircraft 10 includes a fuselage 11 and wings 13. Aircraft 10 includes landing gear such as left landing gear assembly 12, right landing gear assembly 14, and nose landing gear assembly 16 (referred to herein collectively as landing gear assemblies 12, 14, 16). Landing gear assemblies 12, 14, 16 may generally support aircraft 10, when aircraft 10 is not flying, allowing aircraft 10 to taxi, take-off, and land without damage. Landing gear assemblies 12, 14, 16 may each include various shock and strut assemblies with one or more wheels attached thereto. Landing gear assemblies 12, 14, 16 may each be configured to translate between a landing gear down position, wherein the landing gear assemblies extend from wings 13 and/or fuselage 11 to support aircraft 10, and a landing gear up position, wherein the landing gear assemblies are located within wings 13 and/or fuselage 11 of aircraft 10. For example, during taxiing and take-off, and landing, landing gear assemblies 12, 14, 16 may be in the landing gear down position. After take-off, landing gear assemblies 12, 14, 16 may be translated to the landing gear up position. Prior to landing, landing gear assemblies 12, 14, 16 may be translated to the landing gear down position to support aircraft 10 during landing.

Figure 2:
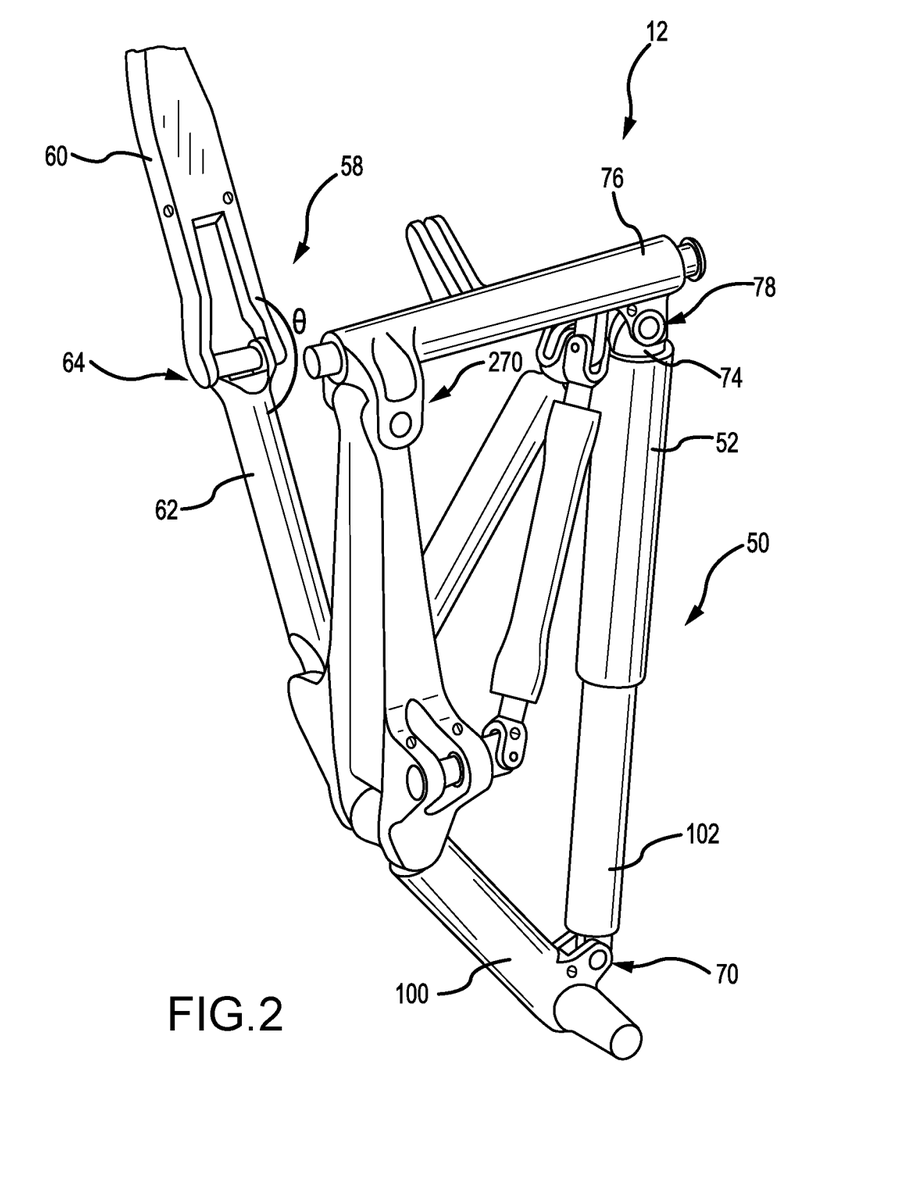
FIG. 2 illustrates components of a landing gear assembly, in accordance with various embodiments.

Referring to FIG. 2, and with continued reference to FIG. 1, components of left landing gear assembly 12 are illustrated, in accordance with various embodiments. While FIGS. 2, 3A, 3B, 4A and 4B illustrate components of left landing gear assembly 12, it should be understood that right landing gear assembly 14 and nose landing gear assembly 16 may include the elements and functionalities as described herein with respect to left landing gear assembly 12.

Left landing gear assembly 12 may include one or more shock absorbing devices, such as for example, shock strut 50. Shock strut 50 may absorb and damp loads imposed on left landing gear assembly 12 during landing, taxiing, braking, and takeoff. Shock strut 50 may include a cylinder and a strut configured to telescope relative to the cylinder. Left landing gear assembly 12 may include various linkage assemblies, such as, for example, linkage assembly 58. Linkage assembly 58 may be configured to translate left landing gear assembly 12 between the landing gear up and landing gear down positions.

In accordance with various embodiments, various components of left landing gear assembly 12 may be coupled to one another via dynamic joints. For example, a first strut 60 of linkage assembly 58 may be coupled to a second strut 62 of linkage assembly 58 via a dynamic joint 64. As used herein, a "dynamic joint" refers to a coupling between a first component and a second component, wherein the first component and/or the second component is/are configured to pivot about the dynamic joint such that an angle of the first component relative to the second components changes. For example, during landing gear extension and retraction (i.e., when left landing gear assembly 12 is translated between the landing gear down and landing gear up positions), second strut 62 pivots about dynamic joint 64 such that an angle theta (θ) between first strut 60 and second strut 62 changes. Left landing gear assembly 12 may include multiple dynamic joints.

In accordance with various embodiments, various components of left landing gear assembly 12 may be coupled to one another via static joints. For example, an end 74 of shock strut cylinder 52 may be coupled to an upper linkage (or strut) 76 via a static joint 78. As used herein, a "static joint" refers to a coupling between a first component and a second component, wherein the first and second component do not pivot about the joint. For example, when left landing gear assembly 12 is translated between the landing gear down and landing gear up positions, the angle between end 74 of shock strut 50 and upper linkage 76 remains relatively constant. While components coupled via a static joint do not rotate, it is further contemplated and understood that the components may exhibit some motion due to structural deflections of the joint generated by loads applied to the landing gear assembly.

In accordance with various embodiments, each of the dynamic joints and static joints of left landing gear assembly 12 comprises a first component coupled to a second component via a pin connection. In other words, each of the dynamic joints and static joints of left landing gear assembly 12 includes a pin located through a first component and through a second component. During landing gear maintenance, lubricant (e.g., grease) may be provided to each pin connection (i.e., to the dynamic and static joints of left landing gear assembly 12). The lubricant may be provided by a lubricant gun fluidly coupled to the inlet of a lubrication channel extending through the first and/or second component to the pin.

Conventional landing gear components may be formed into the desired shape using traditional manufacturing methods, such as casting, forging, or subtractive manufacturing. Lubrication channels are then drilled into the component such that lubricant can be provided to the various component joints during maintenance operations. Such techniques tend to limit the potential geometries and locations of lubrication channels. Additionally, an error or misalignment in channel drilling may result in the component being unusable, such that the component must be discarded, resulting in greater cost and manufacturing time.

Landing gear components of the present disclosure, in accordance with various embodiments, are formed using an additive manufacturing technique. Forming the component using additive manufacturing allows lubrication channels to be formed at the time of component formation, as opposed to drilling the lubrication channels after forming the component. Simultaneously forming the component and the lubrication channels may reduce manufacturing time and cost as the potential for drilling error is eliminated. Additively manufacturing the lubrication channels also allows for channel designs and geometries that could not be produced through conventional manufacturing. For example, in various embodiments, additive manufacturing techniques may be employed to form lubrication channels having a curved or angled flow path. The lubrication channels may be designed to avoid high stress zones in the component. In various embodiments, the cross-sectional shape of the lubrication channel may be tailored to reduce stress concentrations in the component. In this regard, additive manufacturing can enable fabrication of complex lubrication channel designs within a landing gear component.

Figure 3A:
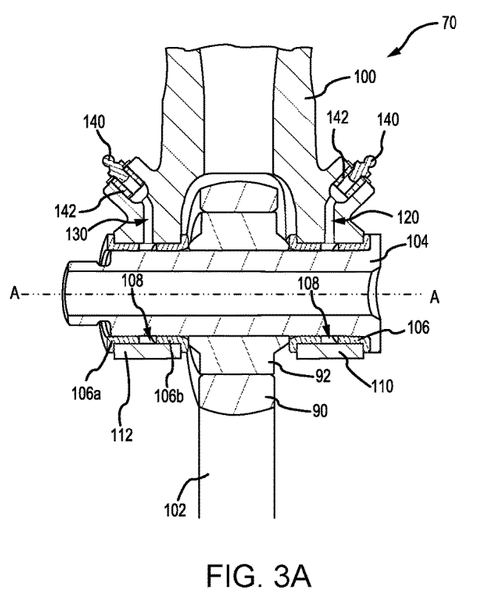
FIGS. 3A and 3B illustrate a dynamic landing gear joint having additively manufactured lubrication channels, in accordance with various embodiments.
Figure 3B:
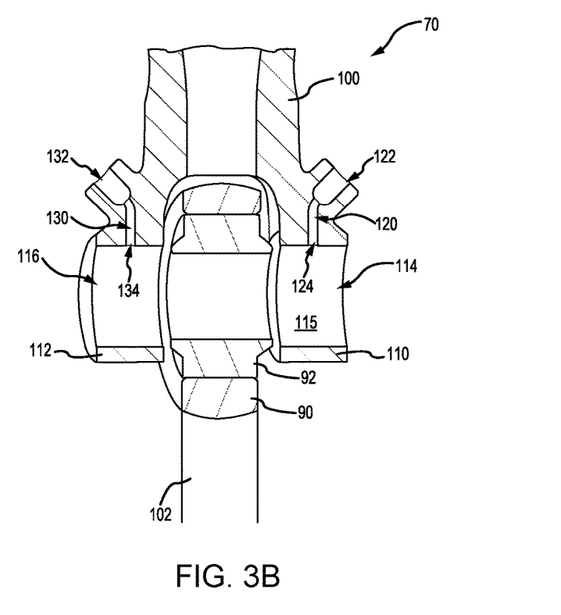

With reference to FIGS. 3A and 3B, and continuing reference to FIG. 2, a cross-section view of a dynamic joint 70 of left landing gear assembly 12 is illustrated, in accordance with various embodiments. While FIGS. 3A and 3B illustrate components of dynamic joint 70, it should be understood that any of the dynamic joints of left landing gear assembly 12 may include the elements and functionalities as described herein with respect to dynamic joint 70.

At dynamic joint 70, a first landing gear component 100 (referred to herein as first component 100) is coupled to a second landing gear component 102 (referred to herein as second component 102) via a pin 104. First component 100 and second component 102 may pivot, relative to one another, about pin 104. In various embodiments, second component 102 may comprise a strut of shock strut 50 configured to telescope relative to shock strut cylinder 52. In various embodiments, an end of second component 102 may include a lug 90 disposed around a spherical bearing 92.

In various embodiments, one or more bushing(s) 106 may be located between first component 100 and pin 104. In FIG. 3B, pin 104 and bushings 106 have been removed to illustrate details of first and second components 100, 102.

In various embodiments, first component 100 may include a first lug 110 and a second lug 112. First lug 110 may define a first pin orifice 114 configured to receive pin 104. Second lug 112 may define a second pin orifice 116 configured to receive pin 104. Second pin orifice 116 is axially aligned with first pin orifice 114. As used in the previous context, "axial" refers to a direction parallel to an axis of rotation A-A through a center of pin 104 and first and second lugs 110, 112.

In accordance with various embodiments, a first lubrication channel 120 is formed through first component 100. In various embodiments, first lubrication channel 120 may be formed through first lug 110. Stated differently, first lug 110 may define, at least, a portion of first lubrication channel 120. First lubrication channel 120 provides a flow path for lubricant (e.g., grease), thereby allowing the lubricant to be provided to pin 104. First lubrication channel 120 includes an inlet 122 and an outlet 124. Outlet 124 is located at the opposite end of the flow path defined by first lubrication channel 120 as compared to inlet 122. In this regard, lubricant is received by, or input into, first lubrication channel 120 at inlet 122, and is expelled, or output, from first lubrication channel 120 at outlet 124. In accordance with various embodiments, outlet 124 is located at first pin orifice 114. In various embodiments, outlet 124 may be circumferentially offset, about axis A-A and/or along circumferential surface 115 of first pin orifice 114, from inlet 122. In various embodiments, the circumferential offset between outlet 124 and inlet 122 may be at least 45°. In various embodiments, the circumferential offset between outlet 124 and inlet 122 may be at least 90°. In various embodiments, the circumferential offset between outlet 124 and inlet 122 may be 180°.

In various embodiments, a second lubrication channel 130 may be formed through first component 100. In various embodiments, second lubrication channel 130 may be formed through second lug 112. Stated differently, second lug 112 may define, at least, a portion of second lubrication channel 130. Second lubrication channel 130 provides a flow path for lubricant (e.g., grease), thereby allowing the lubricant to be provided to pin 104. Second lubrication channel 130 includes an inlet 132 and an outlet 134. Outlet 124 is located at the opposite end of the flow path provided by second lubrication channel 130 as compared to inlet 132. In this regard, lubricant is received by, or input into, second lubrication channel 130 at inlet 132, and is expelled, or output, from second lubrication channel 130 at outlet 134. In accordance with various embodiments, outlet 134 is located at second pin orifice 116. Outlets 124, 134 may be radially aligned with a gap 108 in bushings 106. As used in the previous context, "radial" refers to a direction orthogonal to axis of rotation A-A. In various embodiments, gap 108 may be formed between two discreate bushing pieces. For example, gap 108 may be formed by a first bushing piece 106a that is axially offset with respect to a second bushing piece 106b. In various embodiments, gap 108 may comprise an opening formed through a single, or one piece, bushing 106.

In various embodiments, inlets 122, 132 may each be configured to receive a lubricant dispenser nipple 140. During a maintenance operation, a lubricant dispenser, or lubricant "gun", is fluidly coupled to first and second lubrication channels 120, 130 by inserting lubricant dispenser nipples 140 into inlets 122, 132. Lubricant from the lubricant dispenser may be provided to first and second lubrication channels 120, 130 through lubricant dispenser nipples 140. In various embodiments, a threaded fitting 142 may be inserted into each of inlets 122, 132. Threaded fittings 142 may engage a threaded portion of lubricant dispenser nipples 140. In various embodiments, threaded fittings 142 may be press fit into inlets 122, 132.

In accordance with various embodiments, first component 100 is formed using additive manufacturing. For example, first component 100 may be formed using wire arc additive manufacturing, electron beam additive manufacturing, or any other suitable additive manufacturing technique. Forming first component 100 using additive manufacturing allows the flow paths defined by first and second lubrication channels 120, 130 to be curved and/or angled and/or include bends. In this regard, lubricant may flow axially, radially, and/or circumferentially between inlets 122, 132 and outlets 124, 134 of first and second lubrication channels 120, 130. The geometry of first and second lubrication channels 120, 130 may to be selected to avoid high stress zones. Stated differently, the paths of first and second lubrication channels 120, 130 through first and second lugs 110, 112 may be selected based on the loads and stresses experienced by first and second lugs 110, 112. For example, the paths of first and second lubrication channels 120, 130 through first and second lugs 110, 112 may be selected to avoid high stress zones. In this regard, the first and second lubrication channels 120, 130 may be designed to avoid areas of first and second lugs 110, 112 that experience increased stress during translation between the landing gear up and landing gear down position and/or to avoid areas that experience increased stress from loads generated during, for example, aircraft landing.

Figure 5:
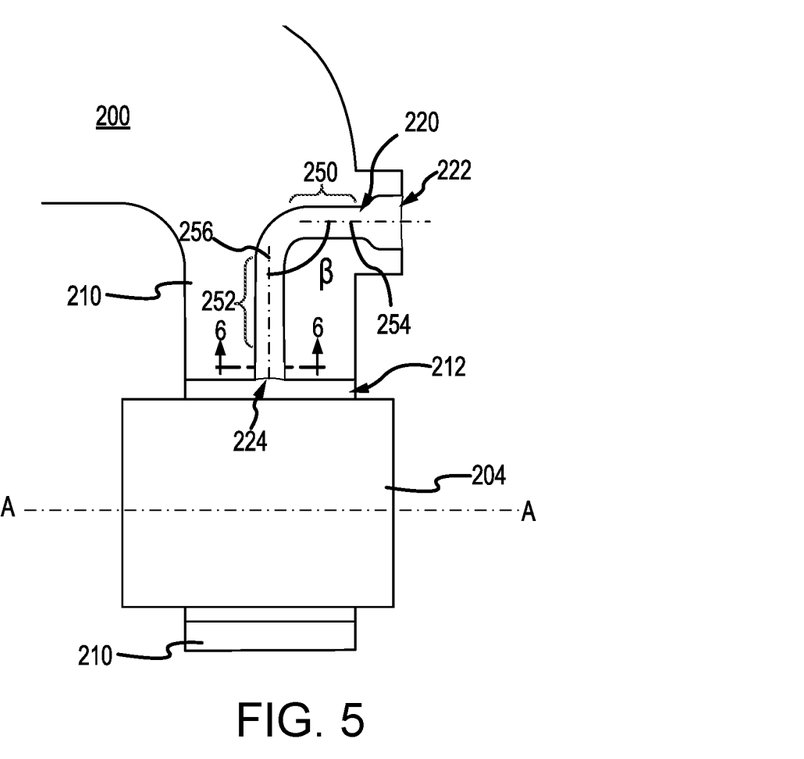
FIG. 5 illustrates a component having additively manufactured lubrication channels, in accordance with various embodiments.

Referring to FIG. 5, details of an additively manufactured component 200 including a lubrication channel 220 are illustrated, in accordance with various embodiments. Additively manufactured component 200 includes a lug 210 defining a pin orifice 212. Pin orifice 212 is configured to receive pin 204. Additively manufactured component 200 may comprise a landing gear component, similar to, for example, first landing gear component 100 in FIGS. 3A and 3B. In various embodiments, first and second lubrication channels 120, 130 in FIGS. 3A and 3B may include the elements and functionalities as described herein with reference to lubrication channel 220. In various embodiments, second component 102 in FIGS. 3A and 3B may be additively manufactured having a lubrication channel formed through lug 90 and including the elements and functionalities as described herein with reference to lubrication channel 220.

Lubrication channel 220 includes an inlet 222 and an outlet 224. Outlet 224 is located at the opposite end of the flow path defined by lubrication channel 220 as compared to inlet 222. In this regard, lubricant is received by lubrication channel 220 at inlet 222, and is output from lubrication channel 220 at outlet 224. In accordance with various embodiments, outlet 224 is located at pin orifice 212. In various embodiments, inlet 222 may be configured to receive a lubricant dispenser nipple.

Lubrication channel 220 is oriented (i.e., a geometry of lubrication channel 220 is selected) to avoid high stress areas in lug 210. In this regard, lubrication channel 220 may be curved, angled, and/or include a bend. In various embodiments, a first portion 250 of lubrication channel 220 is oriented at an angle beta ($\beta$) relative to a second portion 252 of lubrication channel 220. Stated differently, a center axis 254 of first portion 250 is oriented at angle beta ($\beta$) relative to a center axis 256 of second portion 252. In various embodiments, angle beta ($\beta$) is less 180°. In various embodiments, angle beta ($\beta$) may be between 20° and 160°. In various embodiments, angle beta ($\beta$) may be between 45° and 135°. In various embodiments, angle beta may be between 90° and 160°. While lubrication channel 220 is illustrated as having one approximately 90° bend, it is further contemplated and understood and lubrication channel 220 may include any number of bends oriented at any desired angle. Additionally, in various embodiments, lubrication channel 220 may be curved and/or have a circumferential or semi-circular geometry, as additive manufacturing can generate curved flow paths. For example, in various embodiments, portions of lubrication channel 220 may mirror the curvature of pin orifice 212 about axis A-A.

Figure 6A:
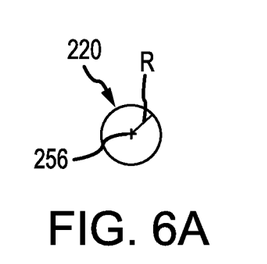
FIGS. 6A, 6B, and 6C illustrate various cross-sectional shapes of a lubrication channel taken along the line 6-6 in FIG. 5.

In various embodiments, the cross-sectional shape of lubrication channel 220 may be tailored to reduce stress concentrations in additively manufactured component 200. With combined reference to FIG. 5 and FIG. 6A, in various embodiments, a cross-section of second portion 252, taken along a plane perpendicular to center axis 256, may comprise a circle having a radius R as measured from center axis 256.

In various embodiments, a cross-section of second portion 252, taken along a plane perpendicular to center axis 256, may comprise an oblong shape, for example, an oval or a race track, wherein a first dimension D1 of the cross-section is greater than a second dimension D2 of the cross-section, wherein the second dimension is perpendicular to the first dimension D1.

Figure 6B:
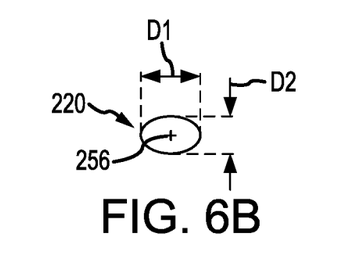

With combined reference to FIG. 5 and FIG. 6B, in various embodiments, a cross-section of second portion 252, taken along a plane perpendicular to center axis 256, may comprise an oval-shape such that first dimension D1 of the cross-section is greater than second dimension D2 of the cross-section.

Figure 6C:
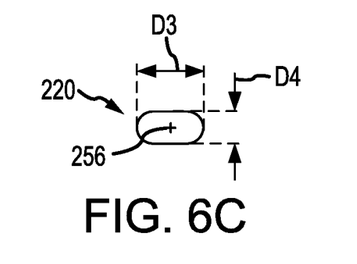

With combined reference to FIG. 5 and FIG. 6C, in various embodiments, a cross-section of second portion 252, taken along a plane perpendicular to center axis 256, may comprise a race track shape having two parallel walls and two semi-circular, or curved, walls at opposing ends of the parallel wall, and wherein a first dimension D3 of the cross-section is greater than a second dimension D4 of the cross-section.

In various embodiments, the cross-sectional area and/or cross-sectional geometry of lubrication channel 220 may vary between inlet 222 and outlet 224. For example, in various embodiments, first portion 250 of lubrication channel 220 may comprise a circular cross-section, as taken in a plane perpendicular to center axis 254, and second portion 252 of lubrication channel 220 may comprise an oblong cross-section.

In various embodiments, second portion 252 may have a race track shape cross-section and outlet 224 of lubrication channel 220 may comprise an oval shape cross-section. In various embodiments, a first section of second portion 252 may have a race track shape cross-section with the greater dimension D3 oriented in an axial direction parallel to axis A-A and a second section of second portion 252 may have a race track shape cross-section with the smaller dimension D4 oriented in the axial direction. The aforementioned combinations cross-section geometry are presented for purposes of illustration only and not of limitation. Lubrication channel 220 may include any number and/or combination of cross-section geometries between inlet 222 and outlet 224.

Figure 4A:
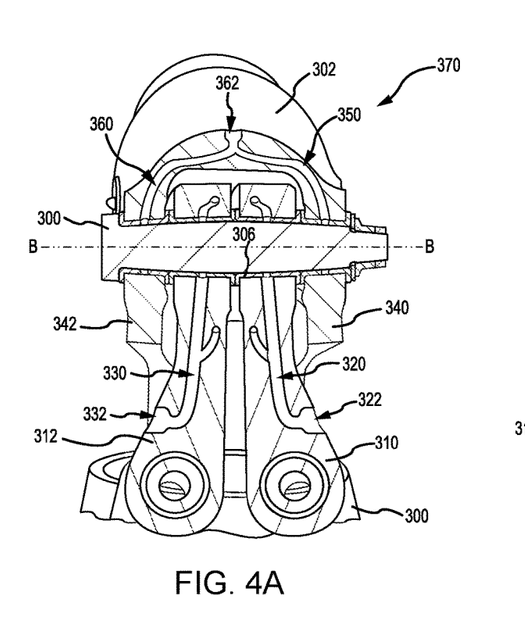
FIGS. 4A and 4B illustrate a static landing gear joint having additively manufactured lubrication channels.
Figure 4B:
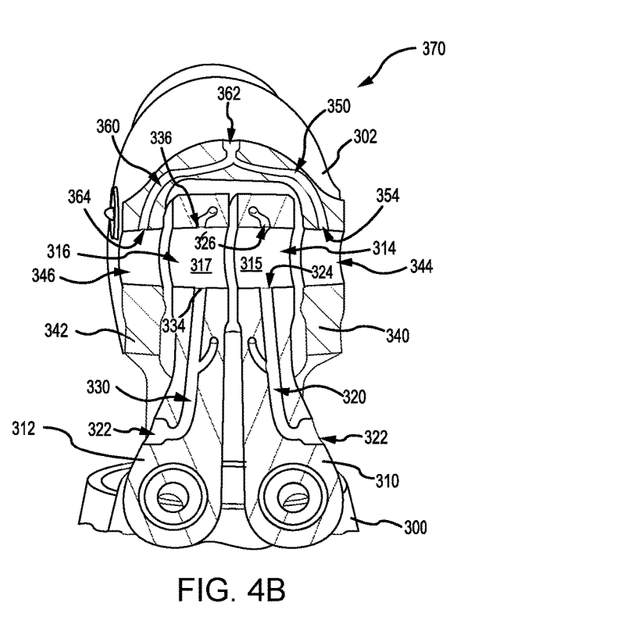

With reference to FIGS. 4A and 4B, a cross-section view of a static joint 270 of left landing gear assembly 12 is illustrated, in accordance with various embodiments. While FIGS. 4A and 4B illustrate components of static joint 270, it should be understood that any of the static joints of left landing gear assembly 12 may include the elements and functionalities as described herein with respect to static joint 270.

At static joint 270, a first landing gear component 300 (referred to herein as first component 300) is coupled to a second landing gear component 302 (referred to herein as second component 302) via a pin 304. In various embodiments, one or more bushing(s) 306 may be located between pin 304 and first and second components 300, 302. In FIG. 4B, pin 304 and bushings 306 have been removed to illustrate details of first and second components 300, 302.

In various embodiments, first component 300 may include a first inner lug 310 and a second inner lug 312. First inner lug 310 may define a first inner pin orifice 314 configured to receive pin 304. Second inner lug 312 may define a second inner pin orifice 316 configured to receive pin 304. Second inner pin orifice 316 is axially aligned with first inner pin orifice 314. As used in the previous context, "axial" refers to a direction parallel to a center axis of B-B of pin 304.

In various embodiments, second component 302 may include a first outer lug 340 and a second outer lug 342. First outer lug 340 may define a first outer pin orifice 344 configured to receive pin 304. Second outer lug 342 may define a second outer pin orifice 346 configured to receive pin 304. Second outer pin orifice 346 is axially aligned with first outer pin orifice 344. First and second outer pin orifices 344, 346 may also be axial aligned with first and second inner pin orifices 314, 316. As used in the previous context, "axial" refers to a direction parallel to a center axis of B-B of pin 304.

In accordance with various embodiments, a first lubrication channel 320 may be formed through first inner lug 310. Stated differently, first inner lug 310 may define, at least, a portion of first lubrication channel 320. First lubrication channel 320 provides a flow path for lubricant (e.g., grease), thereby allowing the lubricant to be provided between pin 304 and first inner lug 310. First lubrication channel 320 includes an inlet 322 and an first outlet 324. In various embodiments, first lubrication channel 320 may comprise a second outlet 326 fluidly coupled to inlet 322. First and second outlets 324, 326 are each located at first inner pin orifice 314. In various embodiments, first lubrication channel 320 may comprise a network of fluidly coupled conduits with each conduit having an outlet located at first inner pin orifice 314.

In various embodiments, second outlet 326 may be circumferentially offset, as measured about axis B-B and/or along circumferential surface 315 of first inner pin orifice 314, from first outlet 324. In various embodiments, the circumferential offset between second outlet 326 and first outlet 324 may be at least 45°. In various embodiments, the circumferential offset between second outlet 326 and first outlet 324 may be at least 90°. In various embodiments, the circumferential offset between second outlet 326 and first outlet 324 may be 180°. In various embodiments, first outlet 324 may be circumferentially offset, as measured about axis B-B and/or along circumferential surface 315 of first inner pin orifice 314, from inlet 322.

In various embodiments, a second lubrication channel 330 may be formed through second inner lug 312. Stated differently, second inner lug 312 may define, at least, a portion of second lubrication channel 330. Second lubrication channel 330 provides a flow path for lubricant (e.g., grease), thereby allowing the lubricant to be provided between pin 304 and second inner lug 312. Second lubrication channel 330 includes an inlet 332 and a first outlet 334. In various embodiments, second lubrication channel 330 may comprise a second outlet 336 fluidly coupled to inlet 322. First and second outlets 334, 336 are each located at second inner pin orifice 316. In various embodiments, second lubrication channel 330 a comprise a network of fluidly coupled conduits with each conduit having an outlet at second inner pin orifice 316.

In various embodiments, second outlet 336 may be circumferentially offset, as measured about axis B-B and/or along circumferential surface 317 of second inner pin orifice 316, from first outlet 324. In various embodiments, the circumferential offset between second outlet 336 and first outlet 334 may be at least 45°. In various embodiments, the circumferential offset between second outlet 336 and first outlet 334 may be at least 90°. In various embodiments, the circumferential offset between second outlet 336 and first outlet 334 may be 180°. In various embodiments, first outlet 334 may be circumferentially offset, as measured about axis B-B and/or along circumferential surface 317 of second inner pin orifice 316, from inlet 332.

In various embodiments, a first lubrication channel 350 may be formed through first outer lug 340 of second component 302. First lubrication channel 350 includes an outlet 354 located at first outer pin orifice 344. First lubrication channel 350 provides a flow path for lubricant (e.g., grease), thereby allowing lubricant to be provided between pin 304 and first outer lug 340.

In various embodiments, a second lubrication channel 360 may be formed through second outer lug 342. Second lubrication channel 360 includes an outlet 364 located at second outer pin orifice 346. Second lubrication channel 360 provides a flow path for lubricant (e.g., grease), thereby allowing lubricant to be provided between pin 304 and second outer lug 342.

First lubrication channel 350 and second lubrication channel 360 may both be fluidly couple to an inlet 362 defined by second component 302. In this regards, lubricant is received by first lubrication channel 350 and second lubrication channel 360 at inlet 362, and is output from first lubrication channel 350 at outlet 354. and from second lubrication channel 360 at outlet 364

In various embodiments, inlets 322, 332, and 362 may each be configured to receive a lubricant dispenser nipple. In various embodiments, a threaded bushing configured to engage a threaded lubricant dispenser nipple may be press fit into inlets 322, 332, and 362.

In accordance with various embodiments, first component 300 and second component 302 each formed using additive manufacturing. For example, first component 300 and second component 302 may be formed using wire arc additive manufacturing, electron beam additive manufacturing, or any other suitable additive manufacturing technique. Forming first and second components 300, 302 using additive manufacturing allows the flow paths defined by lubrication channels 320, 330, 350, 360 to be curved and/or angled and/or include bends. In this regard, lubricant may flow axially, radially, and/or circumferentially between the inlet and the outlet of the lubrication channel. In accordance with various embodiments, lubrication channels 320, 330, 350, 360 may each include the elements and functionalities as described herein with reference to lubrication channel 220 in FIG. 5.

The geometry of lubrication channels 320, 330, 350, 360 may to be selected to avoid high stress zones. Stated differently, the paths of first and second lubrication channels 320, 330 may be selected based on the loads and stresses experienced by first and second inner lugs 310, 312. In this regard, first and second lubrication channels 320, 330 may be designed to avoid areas of first and second inner lugs 310, 312 that experience increased stress during translation between the landing gear up and landing gear down position and/or to avoid areas that experience increased stress from loads generated during, for example, aircraft landing. The paths of first and second lubrication channels 350, 360 may be selected based on the loads and stresses experienced by first and second outer lugs 340, 342. In this regard, first and second lubrication channels 350, 360 may be designed to avoid areas of first and second outer lugs 340, 342 that experience increased stress during translation between the landing gear up and landing gear down position and/or to avoid areas that experience increased stress from loads generated during, for example, aircraft landing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An additively manufactured component for a landing gear assembly, the additively manufactured component comprising:
    a first lug defining a first pin orifice; and
    a first lubrication channel extending through the first lug, the first lubrication channel comprising an inlet and an outlet, wherein the inlet and the outlet are defined by the first lug, and wherein the outlet is located at the first pin orifice, and wherein a center axis of a first portion of the first lubrication channel is oriented at an angle of less than 180° relative to a center axis of a second portion of the first lubrication channel.

2. The additively manufactured component of claim 1, wherein the angle is between 20° and 160°.

3. The additively manufactured component of claim 1, wherein a cross-section of the second portion of the first lubrication channel comprises an oblong shape having a first dimension that is greater than a second dimension, the cross-section of the second portion being taken along a plane perpendicular to the center axis of the second portion.

4. The additively manufactured component of claim 1, wherein a shape of a cross-section of the first portion of the first lubrication channel is different from a shape of a cross-section of the second portion of the first lubrication channel, the cross-section of the first portion being taken along a plane perpendicular to the center axis of the first portion, and the cross-section of the second portion being taken along a plane perpendicular to the center axis of the second portion.

5. The additively manufactured component of claim 1, wherein the inlet of the first lubrication channel is circumferentially offset, along a circumferential surface of the first pin orifice, from the outlet of the first lubrication channel.

6. The additively manufactured component of claim 1, further comprising:
 a second lug defining a second pin orifice axially aligned with the first pin orifice; and
 a second lubrication channel extending through the second lug.

7. The additively manufactured component of claim 6, wherein a center axis of a first portion of the second lubrication channel is oriented at a second angle relative to a center axis of a second portion of the second lubrication channel, and wherein the second angle is less than 180°.

8. The additively manufactured component of claim 6, wherein the second lubrication channel is fluidly connected to the inlet of the first lubrication channel.

9. A landing gear assembly, comprising:
 a first component defining a first pin orifice;
 a first lubrication channel defined by the first component, the first lubrication channel comprising an inlet and a first outlet, wherein the inlet and the first outlet of the first lubrication channel are defined by the first component, and wherein the first outlet is located at the first pin orifice, and wherein a center axis of a first portion of the first lubrication channel is oriented at an angle of less than 180° relative to a center axis of a second portion of the first lubrication channel;
 a second component defining a second pin orifice; and
 a pin located through the first pin orifice and the second pin orifice.

10. The landing gear assembly of claim 9, wherein the angle is between 90° and 160°.

11. The landing gear assembly of claim 9, wherein a cross-section of the second portion of the first lubrication channel comprises an oblong shape having a first dimension that is greater than a second dimension, the cross-section of the second portion being taken along a plane perpendicular to the center axis of the second portion.

12. The landing gear assembly of claim 9, wherein a shape of a cross-section of the first portion of the first lubrication channel is different from a shape of a cross-section of the first outlet of the first lubrication channel, the cross-section of the first portion being taken along a plane perpendicular to the center axis of the first portion, and the cross-section of the second portion being taken along a plane perpendicular to the center axis of the second portion.

13. The landing gear assembly of claim 9, further comprising a second lubrication channel defined by the second component.

14. The landing gear assembly of claim 13, wherein a center axis of a first portion of the second lubrication channel is oriented at a second angle relative to a center axis of a second portion of the second lubrication channel, and wherein the second angle is less than 180°.

15. The landing gear assembly of claim 9, wherein the inlet of the first lubrication channel is circumferentially offset, about an axis of rotation of the pin, from the first outlet of the first lubrication channel.

16. The landing gear assembly of claim 9, wherein the first lubrication channel further includes a second outlet located at the first pin orifice.

17. The landing gear assembly of claim 16, wherein the first outlet is circumferentially offset, about an axis of rotation of the pin, from the second outlet.

18. A method of forming a landing gear component, comprising:
 forming the landing gear component using additive manufacturing, the landing gear component comprising:
  a first lug defining a first pin orifice; and
  a first lubrication channel extending through the first lug, the first lubrication channel comprising an inlet and an outlet, wherein the outlet is located at the first pin orifice, and wherein a center axis of a first portion of the first lubrication channel is oriented at an angle relative to a center axis of a second portion of the first lubrication channel.

19. The method of claim 18, wherein forming the landing gear component comprises:
 forming the first portion of the first lubrication channel having a first cross-section shape; and
 forming the second portion of the first lubrication channel comprising a second cross-section shape different from the first cross-section shape.

20. The method of claim 19, wherein the landing gear component further comprises:
 a second lug defining a second pin orifice; and
 a second lubrication channel extending through the second lug, the second lubrication channel comprising a second outlet located at the second pin orifice.

* * * * *